(12) United States Patent
Sasagawa et al.

(10) Patent No.: US 11,491,691 B2
(45) Date of Patent: Nov. 8, 2022

(54) INJECTION MOLDING SYSTEM

(71) Applicant: SEIKO EPSON CORPORATION, Tokyo (JP)

(72) Inventors: Kakeru Sasagawa, Nagano (JP); Kei Yokota, Nagano (JP); Kenta Anegawa, Nagano (JP); Seiichiro Yamashita, Nagano (JP); Yuji Shinbaru, Nagano (JP); Riona Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/023,454

(22) Filed: Sep. 17, 2020

(65) Prior Publication Data

US 2021/0086414 A1   Mar. 25, 2021

(30) Foreign Application Priority Data

Sep. 19, 2019   (JP) .............................. JP2019-169955

(51) Int. Cl.
*B29C 45/03* (2006.01)
*B29B 13/06* (2006.01)
(Continued)

(52) U.S. Cl.
CPC ............ *B29C 45/03* (2013.01); *B29B 13/065* (2013.01); *B29C 45/18* (2013.01); *B29C 45/401* (2013.01); *B29C 45/42* (2013.01); *B29C 45/47* (2013.01); *B29C 45/74* (2013.01); *B29C 45/7626* (2013.01); *B29C 45/78* (2013.01); *B29C 2045/4068* (2013.01); *B29C 2045/4266* (2013.01); *B29C 2045/7633* (2013.01); *B29C 2945/76531* (2013.01); *B29C 2945/76899* (2013.01)

(58) Field of Classification Search
CPC ......... B29C 45/03; B29C 45/42; B29C 45/40; B29B 13/065
See application file for complete search history.

(56) References Cited

U.S. PATENT DOCUMENTS 2,523,137 A * 9/1950 Nichols .................... B29C 45/03
                                                             425/158
4,402,657 A * 9/1983 Laghi .................. B29C 45/0416
                                                             425/185
(Continued)

FOREIGN PATENT DOCUMENTS

AT           010 374 U1      2/2009
DE       298 04 085 U1      5/1998
(Continued)

*Primary Examiner* — Francisco W Tschen
*Assistant Examiner* — Wayne K. Swier
(74) *Attorney, Agent, or Firm* — Global IP Counselors, LLP (57) ABSTRACT

An injection molding system includes: an injection molding machine where a shaping mold is installed; a material supply device supplying a material to the injection molding machine; a temperature controller controlling a temperature of the shaping mold; a dryer drying a material stored in the material supply device; a controller controlling the injection molding machine; and a casing. The injection molding machine, the material supply device, the temperature controller, the dryer, and the controller are provided inside the casing. The casing has a caster and is configured to be movable.

9 Claims, 9 Drawing Sheets

(51) Int. Cl.
*B29C 45/18* (2006.01)
*B29C 45/40* (2006.01)
*B29C 45/42* (2006.01)
*B29C 45/47* (2006.01)
*B29C 45/74* (2006.01)
*B29C 45/76* (2006.01)
*B29C 45/78* (2006.01)

(56) References Cited

U.S. PATENT DOCUMENTS

| | | | | |
|---|---|---|---|---|
| 6,322,343 B1* | 11/2001 | Yoda | ........... | B29C 45/0084 |
| | | | | 425/144 |
| 2012/0030961 A1* | 2/2012 | Hanaoka | ........... | F26B 5/042 |
| | | | | 34/165 |
| 2013/0101740 A1* | 4/2013 | Nishida | ........... | B29C 45/0053 |
| | | | | 427/256 |
| 2014/0035199 A1* | 2/2014 | Kotitschke | ........... | B29C 45/0416 |
| | | | | 264/328.11 |
| 2016/0311143 A1* | 10/2016 | Yoshioka | ........... | B29C 45/84 |
| 2016/0346979 A1 | 12/2016 | Uchiyama | | |
| 2017/0136671 A1 | 5/2017 | Uchiyama | | |
| 2019/0358903 A1* | 11/2019 | Watanabe | ........... | B29C 64/314 |

FOREIGN PATENT DOCUMENTS

| | | |
|---|---|---|
| JP | S64-038215 A | 2/1989 |
| JP | H01-269512 A | 10/1989 |
| JP | H07-205184 A | 8/1995 |
| JP | 2000-185347 A | 7/2000 |
| JP | 2005-014224 A | 1/2005 |
| JP | 2008-284768 A | 11/2008 |
| JP | 2009-214438 A | 9/2009 |
| JP | 2011-020378 A | 2/2011 |
| JP | 2014-226846 A | 12/2014 |
| JP | 2016-215557 A | 12/2016 |
| JP | 2017-087689 A | 5/2017 |

* cited by examiner

INJECTION MOLDING SYSTEM

The present application is based on, and claims priority from JP Application Serial Number 2019-169955, filed Sep. 19, 2019, the disclosure of which is hereby incorporated by reference herein in its entirety.

BACKGROUND

1. Technical Field

The present disclosure relates to an injection molding system.

2. Related Art

An injection molding machine which melts a material, for example, using a rotor having a spiral groove formed on an end surface, is known. JP-A-2011-20378 discloses an example of such an injection molding machine.

For the injection molding machine to operate, various peripheral devices are needed such as a device supplying a material to the injection molding machine, a temperature controller controlling the temperature of a metal mold, and a controller for controlling the injection molding machine. According to the related art, when these peripheral devices are dispersedly arranged, there is a problem in that the place where the injection molding machine can be used is restricted.

SUMMARY

According to an aspect of the present disclosure, an injection molding system is provided. The injection molding system includes: an injection molding machine where a shaping mold is installed; a material supply device supplying a material to the injection molding machine; a temperature controller controlling a temperature of the shaping mold; a dryer drying a material stored in the material supply device; a controller controlling the injection molding machine; and a casing. The injection molding machine, the material supply device, the temperature controller, the dryer, and the controller are provided inside the casing. The casing has a caster and is configured to be movable.

DESCRIPTION OF EXEMPLARY EMBODIMENTS

A. First Embodiment

Figure 1:
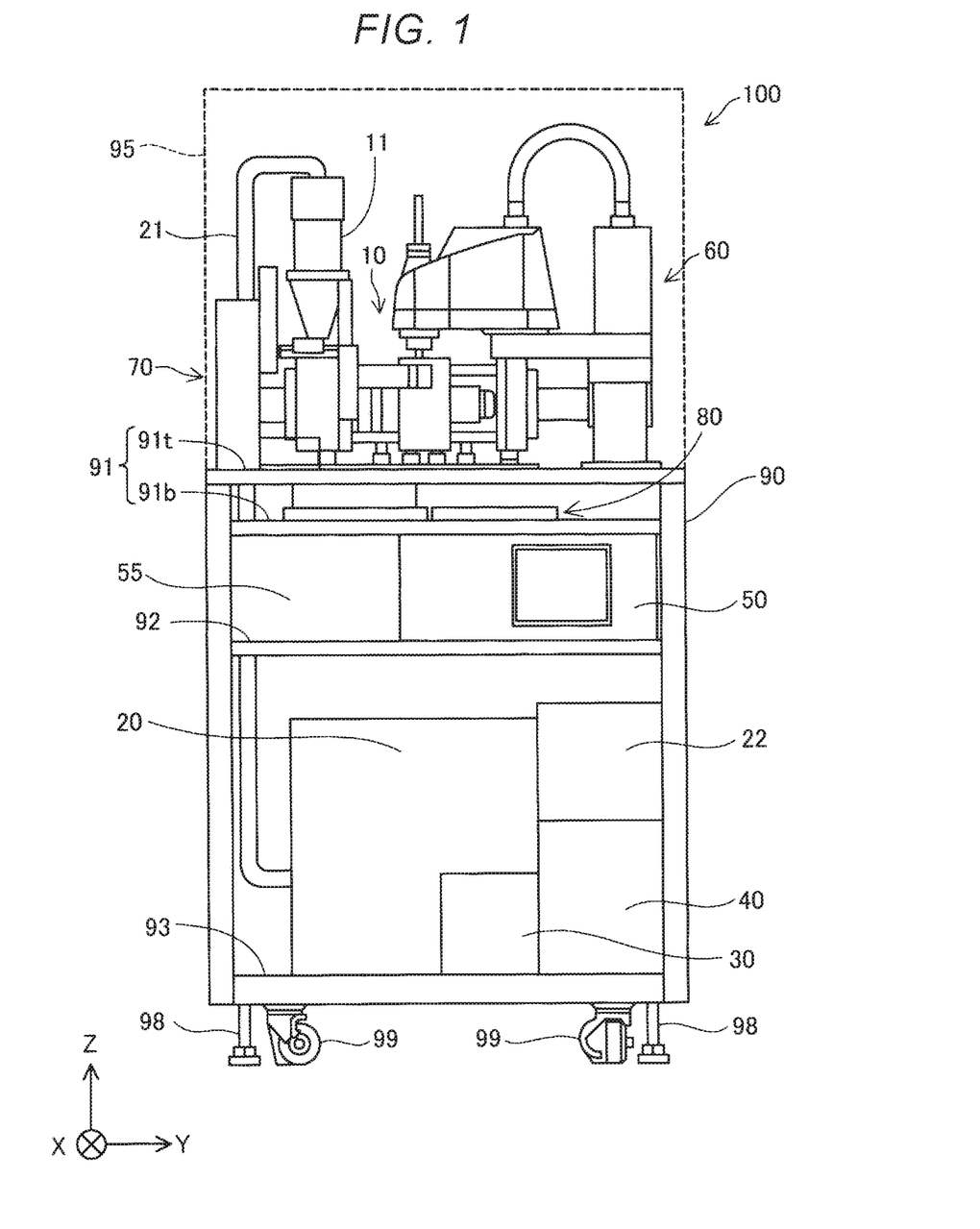
FIG. 1 is a front view showing a schematic configuration of an injection molding system according to a first embodiment.
Figure 2:
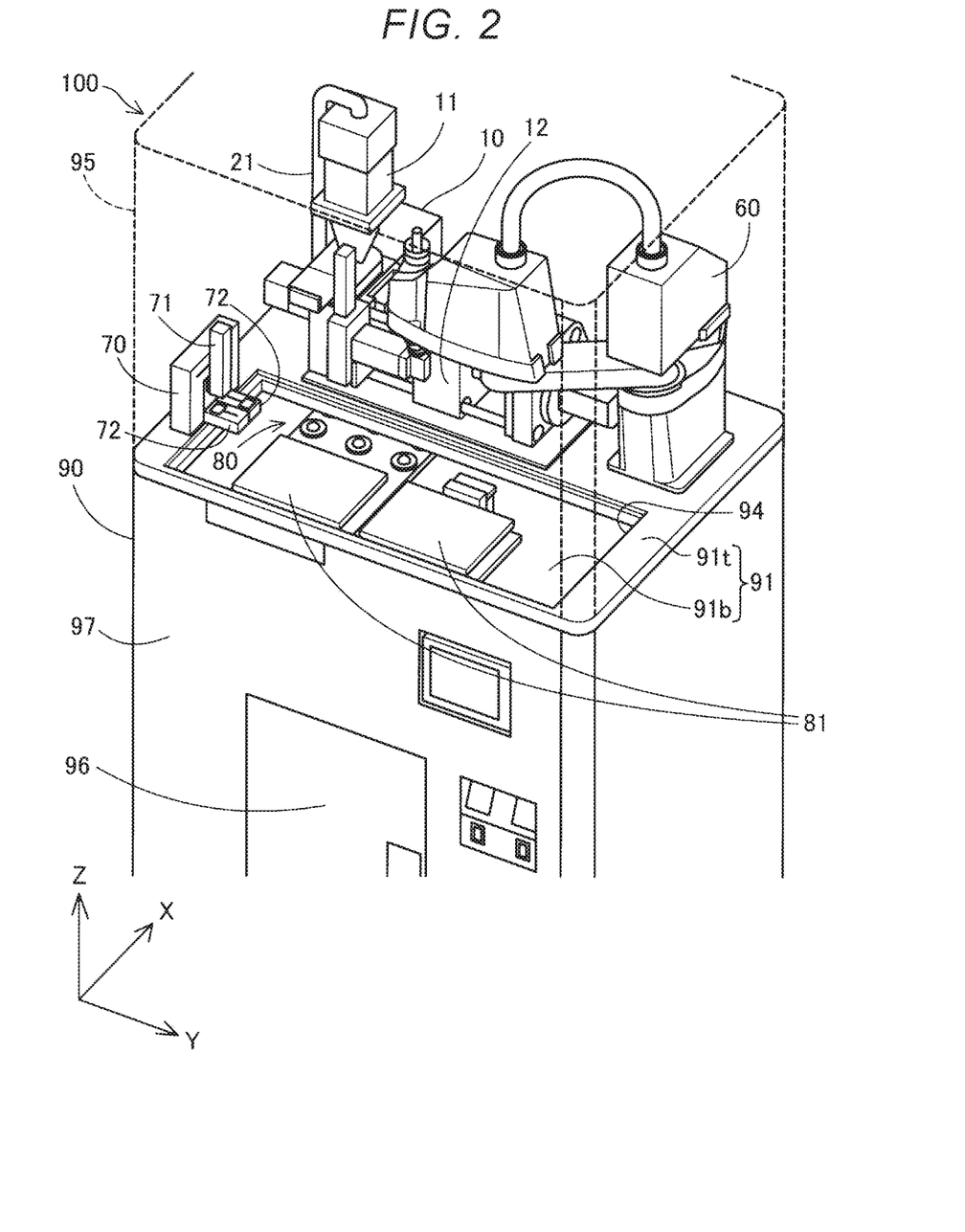
FIG. 2 is a first perspective view of the injection molding system.
Figure 3:
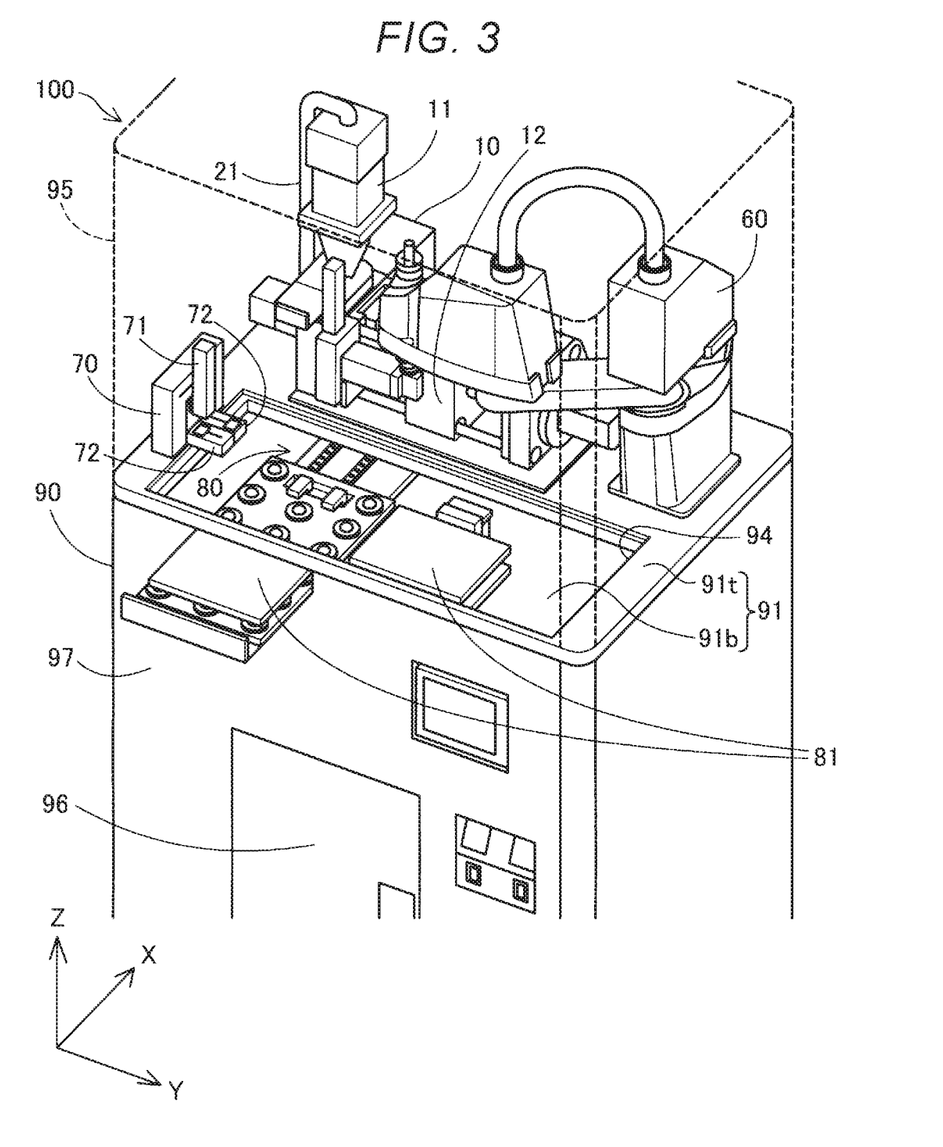
FIG. 3 is a second perspective view of the injection molding system.

FIG. 1 is a front view showing a schematic configuration of an injection molding system according to a first embodiment. FIGS. 2 and 3 are perspective views of the injection molding system. In FIG. 1, X, Y, and Z-directions orthogonal to each other are illustrated. The X-direction and the Y-direction are along the horizontal. The Z-direction is opposite to the vertical. The individual directions shown in FIG. 1 correspond to the individual directions shown in FIG. 2 onward.

As shown in FIGS. 1 and 2, an injection molding system 100 has a casing 90, an injection molding machine 10, a material supply device 20, a dryer 30, a temperature controller 40, a controller 50, a robot 60, an inspection device 70, a moving mechanism 80, and a power supply unit 55 supplying electric power to each of these devices. FIG. 2 shows the state where a side cover 97 is attached to a lateral side of the casing 90. FIG. 1 shows the state where the side cover 97 is removed. The casing 90 has a top cover 95 covering a space above a first base 91, described later. In FIGS. 1 to 3, the top cover 95 is indicated by a dashed line. Preferably, the top cover 95 is formed of a transparent glass or resin so that the state of work inside is visible from outside. The whole or a part of the top cover 95 may be made removable from the casing 90. The injection molding system 100 may not have the side cover 97.

A shaping mold 12 is installed in the injection molding machine 10. The injection molding machine 10 is a device injecting a molten material into the shaping mold and thus forming a molded product. A hopper 11 supplied with a material is coupled to the injection molding machine 10. The shaping mold 12 may be made of a metal or a resin. The shaping mold 12 is also referred to as simply a metal mold.

The material supply device 20 is a device storing a material used in the injection molding machine 10 and supplying the material to the injection molding machine 10. In this embodiment, a resin material in the form of pellets is put into the material supply device 20 from outside. As shown in FIG. 2, the side cover 97 is provided with a door 96 for putting the material into the material supply device 20. The material stored in the material supply device 20 is dried by the dryer 30 coupled to the material supply device 20. The material supply device 20 and the injection molding machine 10 are coupled together via a pipe 21. The material supply device 20 has a compressed air pump 22. The material dried by the dryer 30 is pumped through the pipe 21 from the material supply device 20 by compressed air supplied from the compressed air pump 22 and is supplied to the hopper 11 provided in the injection molding machine 10. As the dryer 30, various dryers can be used, such as hot air dryer, dehumidifying hot air dryer, and reduced-pressure heat transfer dryer.

The temperature controller 40 is a device controlling the temperature of the shaping mold 12 provided in the injection molding machine 10. The temperature controller 40 and the shaping mold 12 are coupled together via a pipe, not illustrated. The temperature controller 40 controls the temperature by circulating a heat medium such as water or oil through the pipe.

The robot 60 is a device taking out the molded product from the shaping mold 12 and placing the molded product on the inspection device 70 or on a tray 81 for transporting the molded product. The robot 60 in this embodiment is formed as a horizontal articulated robot having a built-in robot controller. The robot 60 is provided with a vacuum suction device at the tip of its hand. The robot 60 uses this vacuum suction device and thus takes out the molded product from the shaping mold 12 by vacuum suction. The vacuum suction device is driven by a vacuum generator coupled to the compressed air pump 22. The robot 60 is not limited to a horizontal articulated robot and may be formed as a vertical articulated robot having a plurality of axes. The robot controller may also be arranged at any part of the casing 90 such as a second base 92, described later, instead of being built in the robot 60.

The inspection device 70 is a device inspecting the molded product taken out of the shaping mold 12. In this embodiment, the inspection device 70 has one camera 71 and two lines of transport mechanisms 72. Each transport mechanism 72 can move back and forth along the Y-direction. The camera 71 can move back and forth along the X-direction. The operations of the transport mechanisms 72 and the camera 71 are controlled by the controller 50. The molded product is placed alternately at the respective transport mechanisms 72 by the robot 60. The molded product placed at the respective transport mechanisms 72 is transported alternately by these transport mechanisms 72 to a photographing position of the camera 71. The camera 71 moves back and forth along the X-direction and picks up an image of the molded product transported to the photographing position by the respective transport mechanisms 72. The inspection device 70 performs visual inspection of the molded product, based on the picked-up image.

The moving mechanism 80 is a mechanism for moving the tray 81 where the molded product is placed by the robot 60, to an ejection position where the tray 81 can be taken out from outside. The moving mechanism 80 is controlled by the controller 50. The moving mechanism 80 has a slide table having the tray 81 placed thereon and moving parallel to the X-direction on a rail, and a fixed table provided near the slide table and configured to move the tray 81 parallel to the Y-direction between the fixed table and the slide table. The slide table and the fixed table are provided with a ball roller over an entire range where the tray 81 moves. The moving mechanism 80 has an actuator for moving the tray 81 on the slide table and the fixed table, and an actuator for moving the slide table on a rail. In this embodiment, the robot 60 first transports the molded product taken out of the injection molding machine 10 to the inspection device 70, and places the molded product inspected by the inspection device 70 onto the tray 81 set in the moving mechanism 80. When the molded product is placed on the tray 81, the moving mechanism 80 transports the tray 81 to a position where the tray 81 can be taken out from outside, as shown in FIG. 3. Two trays 81 are set in the moving mechanism 80. The moving mechanism 80 moves these trays 81 on the slide table and the fixed table and through a predetermined route and thus moves these trays 81 to a position where the trays 81 can be alternately taken out. The tray 81 can also be referred to as a pallet. The moving mechanism 80 can also be referred to as a pallet changer.

The controller 50 is a device which comprehensively controls the injection molding machine 10, the inspection device 70, the robot 60, and the moving mechanism 80. In this embodiment, the controller 50 is formed of a PLC (programmable logic controller). The controller 50 formed of a PLC is programmed in a language such as ladder language and thus controls coordinated operations of respective devices such as the molding by the injection molding machine 10, the taking out of the molded product by the robot 60, the inspection of the molded product by the inspection device 70, and the transport of the molded product by the moving mechanism 80.

All of the above devices, that is, the injection molding machine 10, the material supply device 20, the compressed air pump 22, the dryer 30, the temperature controller 40, the controller 50, the power supply unit 55, the inspection device 70, and the moving mechanism 80, are provided inside the casing 90.

The casing 90 has a caster 99 at a corner of its bottom surface. Therefore, the injection molding system 100 is configured to be freely movable. In this embodiment, a bolt-type stopper 98 is provided near the caster 99 at the bottom surface of the casing 90. The user can fix the injection molding system 100 at an installation site by using this stopper 98.

The casing 90 has a first base 91, a second base 92, and a third base 93. The first base 91 is a stage arranged at an uppermost part of the casing 90. The second base 92 is a stage arranged below the first base. The third base 93 is a stage arranged below the second base.

In this embodiment, the injection molding machine 10, the robot 60, the inspection device 70, and the moving mechanism 80 are arranged at the first base 91. The controller 50 is arranged at the second base 92. In this embodiment, the power supply unit 55, too, is arranged at the second base 92. The material supply device 20, the temperature controller 40, and the dryer 30 are arranged at the third base 93. In this embodiment, the compressed air pump 22, too, is arranged at the third base 93.

In this embodiment, the first base 91 includes a top stage part 91*t* and a bottom stage part 91*b* located below the top stage part 91*t*. The injection molding machine 10, the robot 60, and the inspection device 70 are arranged at the top stage part 91*t*. The moving mechanism 80 is arranged at the bottom stage part 91*b*.

Figure 4:
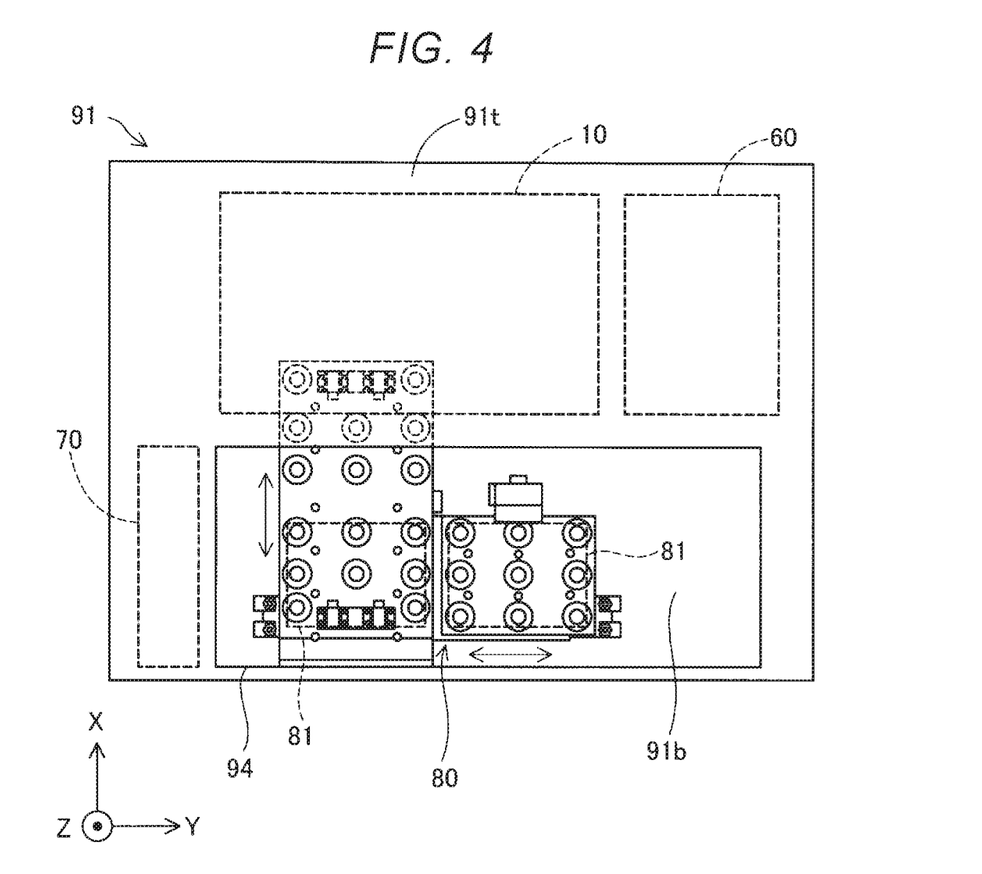
FIG. 4 schematically shows the arrangement of each device on a first base.

FIG. 4 schematically shows the arrangement of each device at the first base 91. In this embodiment, when the casing 90 is viewed from above, the area over the first base 91 is roughly divided into an area on the +X side and an area on the −X side. In the area on the +X side, the injection molding machine 10 and the robot 60 are arranged. In the area on the −X side, the inspection device 70 and most of the moving mechanism 80 are arranged. An opening 94 is formed in an area on the −X side of the top stage part 91*t* of the first base 91. The bottom stage part 91*b* is exposed via the opening 94. In this embodiment, that "the robot 60 is arranged" means that a base part supporting an arm of the robot 60 is arranged.

In this embodiment, when the casing 90 is viewed from above, at least one of the injection molding machine 10, the robot 60, and the inspection device 70 is arranged at the top stage part 91*t* in such a way as to overlap a part of the moving mechanism 80 arranged at the bottom stage part 91*b*. In this embodiment, the injection molding machine 10 is arranged in such a way as to overlap a part of the moving mechanism 80. Therefore, the tray 81 transported by the moving mechanism 80 is movable to enter a space below the injection molding machine 10, at the bottom stage part 91*b*. In another embodiment, the robot 60 or the inspection device 70 may be arranged at the top stage part 91*t* in such a way as to overlap a part of the moving mechanism 80. Also, all of the injection molding machine 10, the robot 60, and the inspection device 70 may be arranged at the top stage part 91*t* in such a way as to overlap a part of the moving mechanism 80.

In this embodiment, when the casing 90 is viewed from above, the inspection device 70, the injection molding machine 10, and the robot 60 are arranged substantially clockwise in this order around the moving mechanism 80. In another embodiment, the inspection device 70, the injection molding machine 10, and the robot 60 may be arranged counterclockwise in this order.

Figure 5:
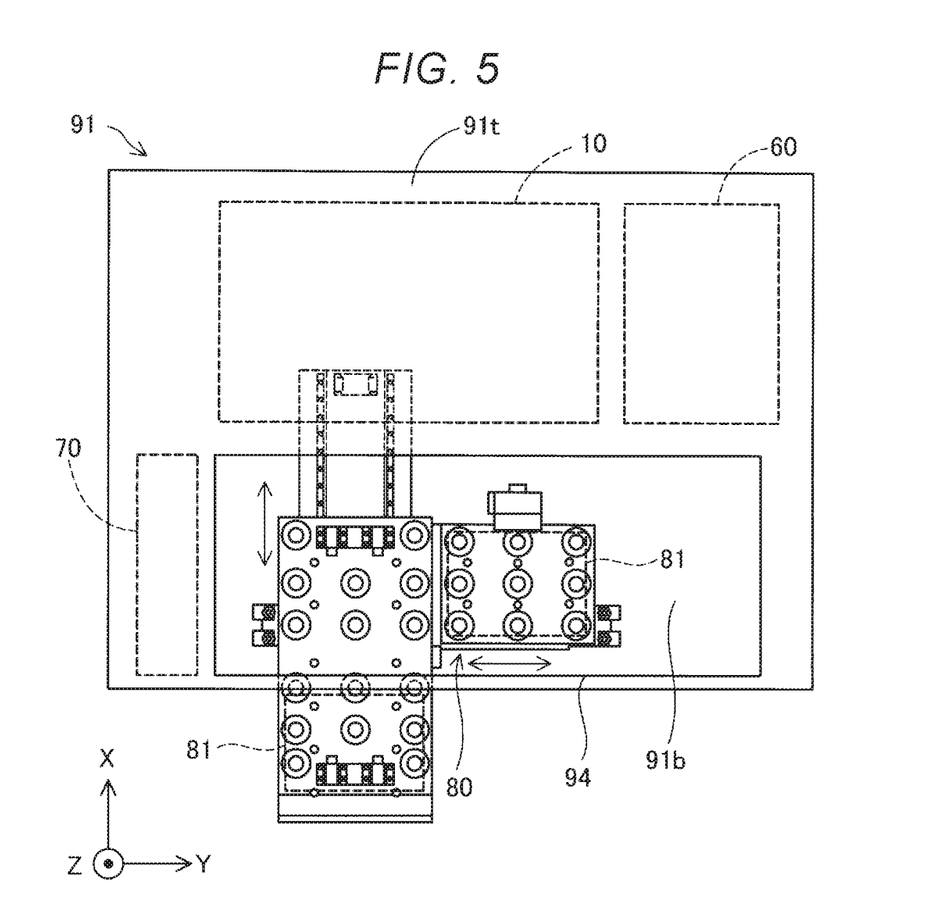
FIG. 5 shows a tray ejection position.

FIG. 5 shows the ejection position of the tray 81. The moving mechanism 80 discharges the tray 81 to the outside of the casing 90. The outside position is the ejection position of the molded product. In this embodiment, when the casing 90 is viewed from above, the arrangement area where the inspection device 70, the injection molding machine 10, and the robot 60 are arranged and the ejection position of the molded product do not overlap each other.

Figure 6:
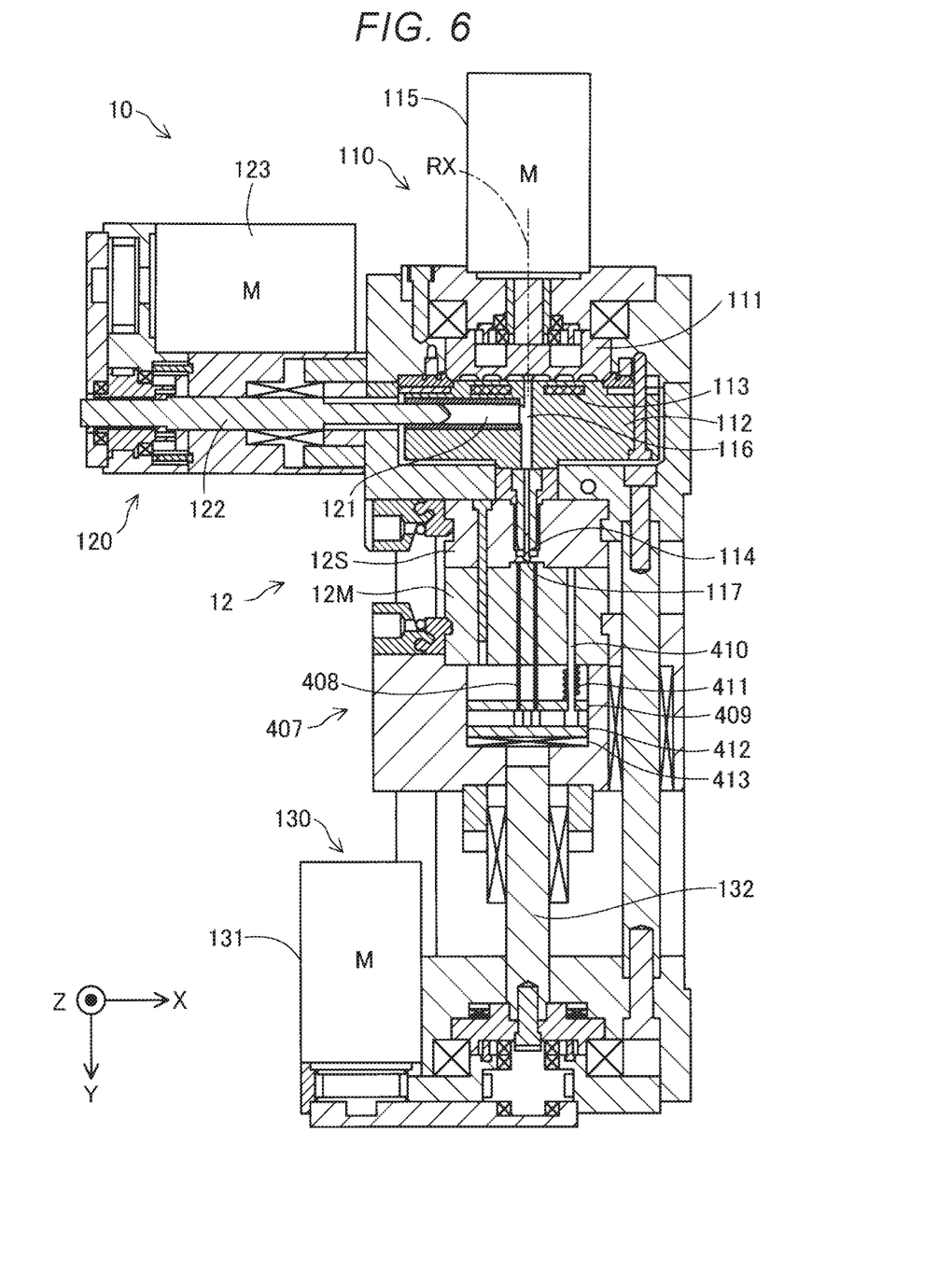
FIG. 6 is an explanatory view showing a schematic configuration of an injection molding machine.

FIG. 6 is an explanatory view showing a schematic configuration of the injection molding machine 10. The injection molding machine 10 has a plasticizer 110, an injection control mechanism 120, the shaping mold 12, and a mold clamping device 130.

The plasticizer 110 has a flat screw 111, a barrel 112, a heater 113, a nozzle 114, and a screw drive unit 115. The flat screw 111 is rotationally driven about a rotation axis RX by the screw drive unit 115 formed of a motor. A communication hole 116 is formed in the center of the barrel 112. An injection cylinder 121, described later, is coupled to the communication hole 116. The rotation of the flat screw 111 by the screw drive unit 115 and the heating by the heater 113 are controlled by the controller 50.

Figure 7:
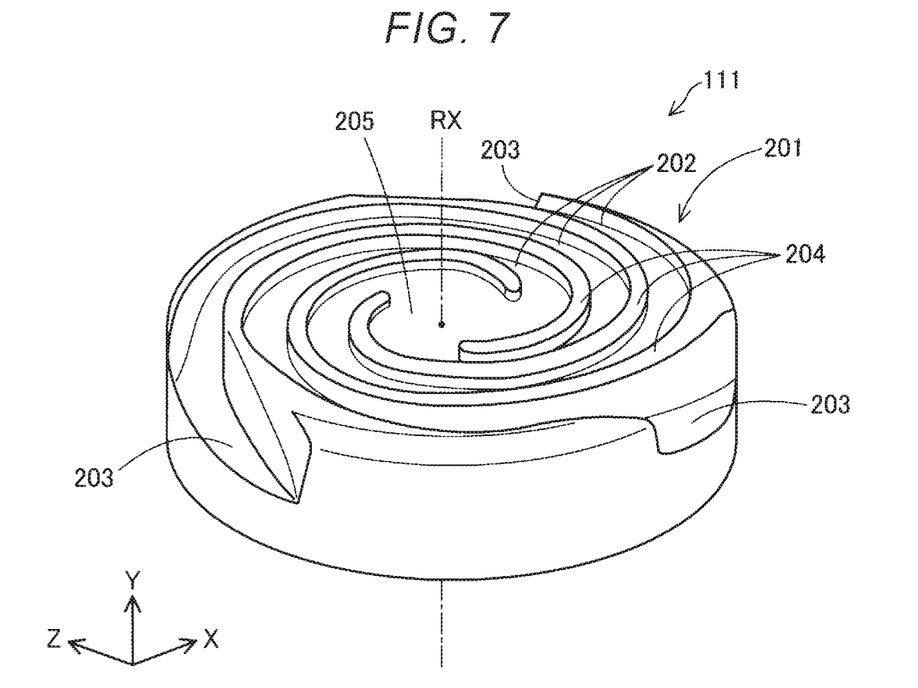
FIG. 7 is a perspective view showing a schematic configuration of a flat screw.

FIG. 7 is a perspective view showing a schematic configuration of the flat screw 111. The flat screw 111 has a substantially cylindrical shape such that the height in an axial direction, which is a direction along its center axis, is shorter than the diameter. At an end surface 201 facing the barrel 112, of the flat screw 111, a whirlpool-like groove 202 is formed about a planar center part 205. The groove 202 communicates with a material inlet 203 formed on the lateral surface of the flat screw 111. The material supplied from the hopper 11 is supplied to the groove 202 via the material inlet 203. The groove 202 is separated into several grooves by a protrusion 204. Although FIG. 7 shows an example where three grooves 202 are formed, the number of grooves 202 may be one, or two or more.

Figure 8:
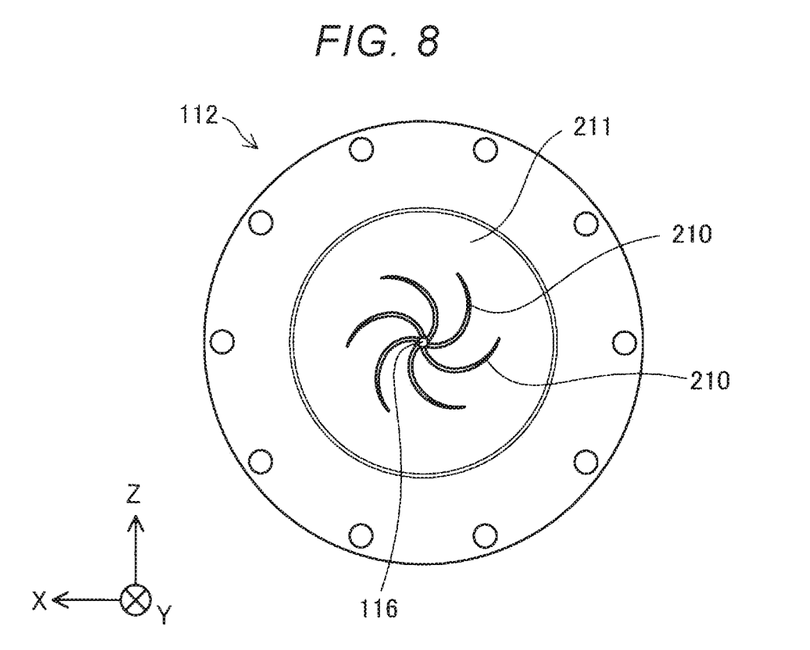
FIG. 8 is a schematic plan view of a barrel.

FIG. 8 is a schematic plan view of the barrel 112. The barrel 112 has a counter surface 211 facing the end surface 201 of the flat screw 111. The communication hole 116 is formed in the center of the counter surface 211. At the counter surface 211, a plurality of guide grooves 210 coupled to the communication hole 116 and extending in a whirlpool-like form from the communication hole 116 toward the outer circumference are formed. The material supplied to the grooves 202 in the flat screw 111 is melted between the flat screw 111 and the barrel 112 due to the rotation of the flat screw 111 and the heating by the heater 113, flows along the grooves 202 and the guide grooves 210 due to the rotation of the flat screw 111, and is guided to the center part 205 of the flat screw 111. The material flowing into the center part 205 is guided to the injection control mechanism 120 from the communication hole 116 provided in the center of the barrel 112.

The injection control mechanism 120 has an injection cylinder 121, a plunger 122, and a plunger drive unit 123. The injection control mechanism 120 has the function of injecting the molten material in the injection cylinder 121 into a cavity 117, described later. The injection control mechanism 120 under the control of the controller 50 controls the amount of the molten material injected from the nozzle 114. The injection cylinder 121 is a substantially cylindrical member coupled to the communication hole 116 in the barrel 112 and has the plunger 122 inside. The plunger 122 slides inside the injection cylinder 121 and pumps the molten material in the injection cylinder 121 to the nozzle 114 provided in the plasticizer 110. The plunger 122 is driven by the plunger drive unit 123 formed of a motor.

The shaping mold 12 has a moving mold 12M and a fixed mold 12S. The moving mold 12M and the fixed mold 12S are provided facing each other and have a cavity 117 in-between, which is a space corresponding to the shape of the molded product. The molten material is pumped by the injection control mechanism 120 and injected into the cavity 117 from the nozzle 114.

The mold clamping device 130 has a shaping mold drive unit 131 and has the function of opening and closing the moving mold 12M and the fixed mold 12S. The mold clamping device 130 under the control of the controller 50 drives the shaping mold drive unit 131 formed of a motor, thus rotates a ball screw 132 to move the moving mold 12M coupled to the ball screw 132 relatively to the fixed mold 12S, and opens and closes the shaping mold 12. That is, in the injection molding system 100, the fixed mold 12S is static and the moving mold 12M moves relatively to the static fixed mold 12S, thus opening and closing the shaping mold 12.

The moving mold 12M is provided with an extrusion mechanism 407 to release the molded product from the shaping mold 12. The extrusion mechanism 407 has an ejector pin 408, a support plate 409, a support rod 410, a spring 411, an extrusion plate 412, and a thrust bearing 413.

The ejector pin 408 is a rod-like member for extruding a molded product molded inside the cavity 117. The ejector pin 408 is provided in such a way as to penetrate the moving mold 12M and reach the cavity 117. The support plate 409 is a plate member supporting the ejector pin 408. The ejector pin 408 is fixed to the support plate 409. The support rod 410 is fixed to the support plate 409 and is inserted in a penetration hole formed in the moving mold 12M. The spring 411 is arranged in the space between the moving mold 12M and the support plate 409. The support rod 410 is inserted in the spring 411. At the time of molding, the spring 411 energizes the support plate 409 in such a way that the head of the ejector pin 408 forms a part of the wall surface of the cavity 117. The extrusion plate 412 is fixed to the support plate 409. The thrust bearing 413 is attached to the extrusion plate 412 and is provided in such a way that the head of the ball screw 132 does not damage the extrusion plate 412. Also, a thrust slide bearing or the like may be used instead of the thrust bearing 413.

Figure 9:
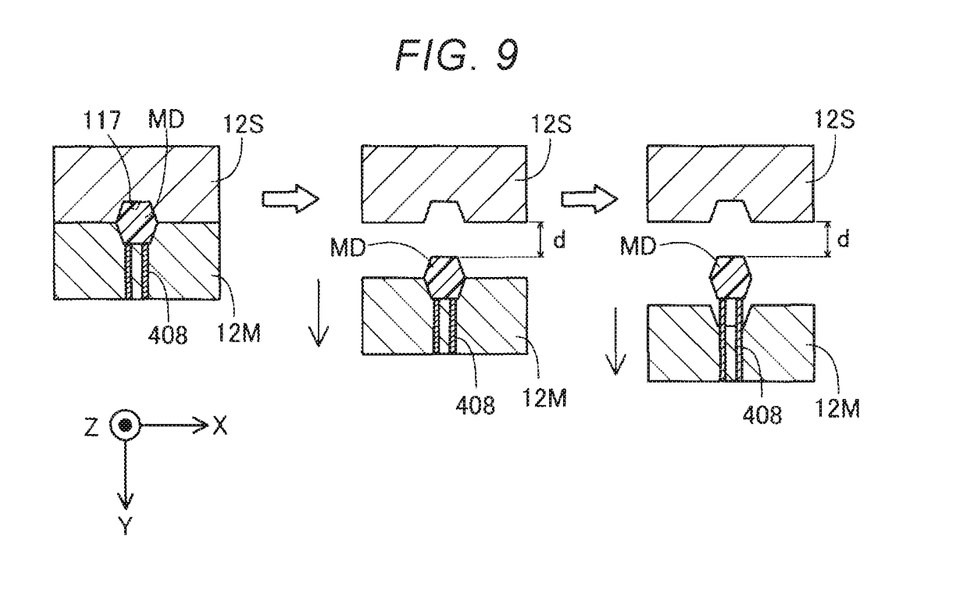
FIG. 9 is an explanatory view showing the movement of a shaping mold.

FIG. 9 is an explanatory view showing the movement of the shaping mold 12. When the mold clamping device 130 shown in FIG. 6 drives the ball screw 132 to move the moving mold 12M relatively to the fixed mold 12S into the +Y direction by a predetermined amount d as shown in FIG. 9, the end of the ball screw 132 on the −Y side comes into contact with the thrust bearing 413 and the ejector pin 408 no longer moves in the +Y direction. As the moving mold 12M is moved further into the +Y direction in this state, only the moving mold 12M moves into the +Y direction in state where the ejector pin 408 is in contact with a molded product MD. Therefore, the ejector pin 408 relatively extrudes the molded product MD from inside the cavity 117. The molded product MD is thus released from the moving mold 12M.

That is, in this embodiment, the molded product MD is released from the moving mold 12M at the position where the molded product MD has become static, without moving the ejector pin 408 itself to protrude. The robot 60 takes out the molded product MD thus released, from the injection molding machine 10.

In the injection molding system 100 according to this embodiment, not only the injection molding machine 10 but also all of the material supply device 20, the temperature controller 40, the dryer 30, and the controller 50, which are necessary for the injection molding machine 10 to operate, are arranged inside the one casing 90. The casing 90 is configured to be movable via the caster 99. Therefore, the injection molding machine 10 can be freely moved within a facility such as an industrial plant. Restrictions on the place where the injection molding machine 10 can be used can be restrained.

According to this embodiment, the robot 60 taking out the molded product from the shaping mold 12, the inspection device 70 inspecting the molded product, and the moving mechanism 80 moving the tray 81 where the molded product is placed, to the ejection position where the tray 81 can be taken out from outside, are provided inside the casing 90. Therefore, all of the devices used in the post-process after injection molding are arranged inside the casing 90. This improves the convenience of the injection molding system 100.

In this embodiment, the first base 91, the second base 92, and the third base 93 are provided inside the casing 90. The injection molding machine 10, the robot 60, the inspection device 70, and the moving mechanism 80 are arranged at the first base 91. The controller 50 is arranged at the second base 92. The material supply device 20, the temperature controller 40, and the dryer 30 are arranged at the third base 93. Therefore, the respective devices can be efficiently arranged inside the casing 90 while the controller 50 is spaced apart from heat sources such as the injection molding machine 10, the dryer 30, and the temperature controller 40.

In this embodiment, the first base 91 includes the top stage part 91t and the bottom stage part 91b. The moving mechanism 80 is arranged at the bottom stage part 91b. When the casing 90 is viewed from above, at least one of the injection molding machine 10, the robot 60, and the inspection device 70 is arranged at the top stage part 91t in such a way as to overlap a part of the moving mechanism 80. Therefore, the horizontal dimension of the injection molding system 100 can be made compact while the operation range of the moving mechanism 80 is extended.

In this embodiment, when the casing 90 is viewed from above, the inspection device 70, the injection molding machine 10, and the robot 60 are arranged clockwise or counterclockwise in this order in the casing 90. This enables the robot 60 to efficiently transport the molded product between the injection molding machine 10 and the inspection device 70.

In this embodiment, when the casing 90 is viewed from above, the arrangement area where the inspection device 70, the injection molding machine 10, and the robot 60 are arranged, and the ejection position of the molded product, do not overlap each other. Therefore, the ejection of the molded product by the user can be restrained from affecting the operation of the robot 60.

In this embodiment, the material supply device 20 has the compressed air pump 22 generating compressed air. The material is supplied to the injection molding machine 10 via this compressed air. Therefore, the injection molding system can operate without being supplied with compressed air from equipment at the industrial plant. This can increase the degree of freedom in installation of the injection molding system 100. Also, in this embodiment, the temperature controller 40 controls temperature by circulating a heat medium between the temperature controller 40 and the shaping mold 12. Therefore, the temperature controller 40 need not be supplied with water from equipment at the industrial plant. This can further increase the degree of freedom in installation of the injection molding system 100.

Figure 10:
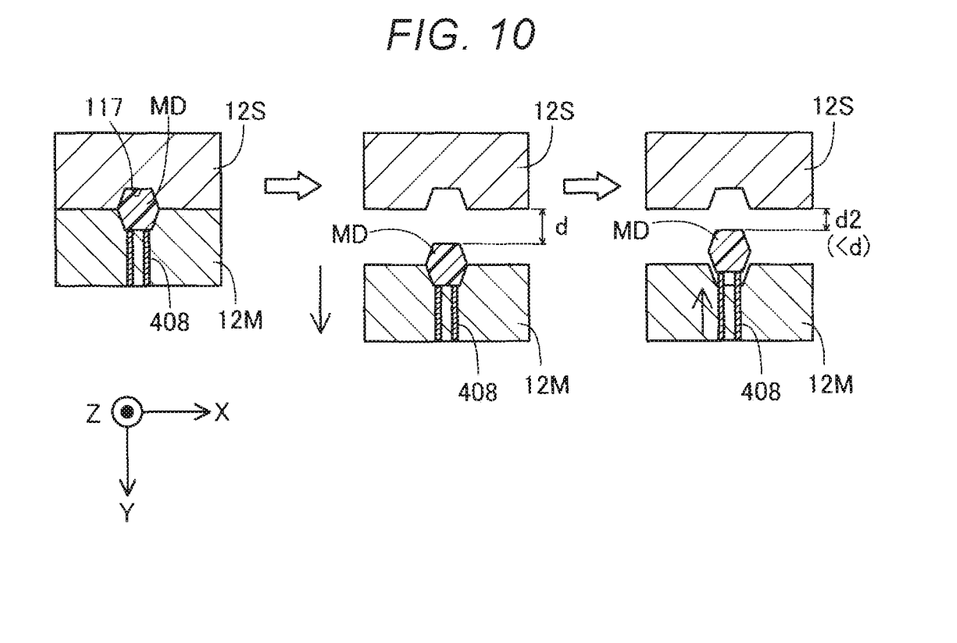
FIG. 10 is an explanatory view showing the movement of a shaping mold in a comparative example.

In this embodiment, instead of moving the ejector pin 408 itself, the moving mold 12M moves relatively to the fixed mold 12S, thus causing the ejector pin 408 to protrude from the moving mold 12M toward the fixed mold 12S. In contrast, in a comparative example shown in FIG. 10, after the moving mold 12M is moved relatively to the fixed mold 12S into the +Y direction by a predetermined amount d, the moving mold 12M is stopped and the ejector pin 408 is moved into the −Y direction. Therefore, the molded product MD moves with the movement of the ejector pint 408. The distance between the fixed mold 12S and the molded product MD is a distance d2, which is shorter than the moving distance d of the moving mold 12M. That is, when the ejector pin 408 itself is moved, the position where the molded product MD is released from the mold is more likely to change from one molding to another. However, in this embodiment, since the moving mold 12M, instead of the ejector pin 408, is moved to release the molded product, as described above, the molded product MD can be released from the moving mold 12M without changing the position of the molded product MD. This enables the robot 60 to take out the molded product with high accuracy.

In this embodiment, since the material is melted using the flat screw 111, the injection molding machine 10 can be miniaturized. Therefore, the injection molding system 100 can be made compact.

B. Second Embodiment

Figure 11:
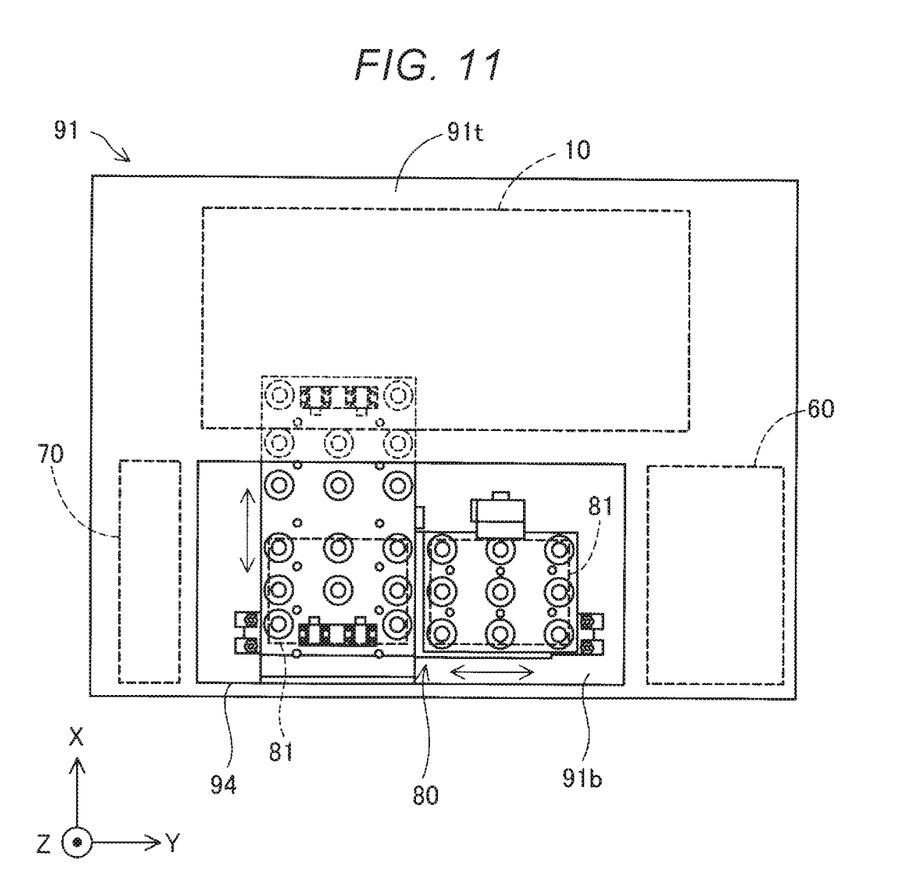
FIG. 11 schematically shows the arrangement of each device in a second embodiment.

FIG. 11 schematically shows the arrangement of each device in a second embodiment. In the first embodiment, when the casing 90 is viewed from above, the injection molding machine 10 and the robot 60 are arranged in the area on the +X side of the first base 91, and the inspection device 70 and most of the moving mechanism 80 are arranged in the area on the −X side, as shown in FIG. 4. In contrast, in the second embodiment, only the injection molding machine 10 is arranged in the area on the +X side, and the robot 60, the inspection device 70, and most of the moving mechanism 80 are arranged in the area on the −X side, as shown in FIG. 11. In this way, the position where each device is arranged over the first base 91 is not limited to the position in the foregoing embodiment and can be set to any position. For example, in FIG. 11, the positions where the robot 60 and the inspection device 70 are arranged may be reversed. In FIG. 4, the positions where the injection molding machine 10 and the robot 60 are arranged may be reversed.

C. Other Embodiments (C-1) In the foregoing embodiments, the injection molding system 100 may not have the robot 60, the inspection device 70, and the moving mechanism 80, which are used in the post-process after injection molding.

(C-2) In the foregoing embodiments, the injection molding system 100 has a three-stage configuration having the first base 91, the second base 92, and the third base 93 inside the casing 90. However, for example, the injection molding system 100 may have only the first base 91 and the third base 93 inside the casing 90 and may not have the second base 92. In this case, the controller 50 and the power supply unit 55 are arranged at one of the first base 91 and the third base 93. Also, the casing 90 may have more bases.

(C-3) In the foregoing embodiments, any arrangement of the respective devices at the respective bases may be made. For example, the controller 50 may be arranged at the third base 93, and the material supply device 20, the temperature controller 40, and the dryer 30 may be arranged at the second base 92.

(C-4) In the foregoing embodiments, when the casing 90 is viewed from above, the moving mechanism 80 may be arranged in such a way as not to overlap the injection molding machine 10, the robot 60, and the inspection device 70. In this case, the first base 91 may not be divided into the top stage part 91t and the bottom stage part 91b. The moving mechanism 80, the injection molding machine 10, the robot 60, and the inspection device 70 may be arranged at a single plane.

(C-5) In the foregoing embodiments, when the casing 90 is viewed from above, the inspection device 70, the injection molding machine 10, and the robot 60 may not be arranged clockwise or counterclockwise. For example, these devices may be arranged in a straight line.

(C-6) In the foregoing embodiments, when the casing 90 is viewed from above, the arrangement area where the inspection device 70, the injection molding machine 10, and the robot 60 are arranged, and the ejection position where the molded product is taken out, may overlap each other. For example, the molded product may be transported by the robot 60 or the moving mechanism 80 to a position below or above the arrangement area where the inspection device 70, the injection molding machine 10, and the robot 60 are arranged. The molded product may be taken out at this position.

(C-7) In the foregoing embodiments, the injection molding system 100 has the compressed air pump 22. However, the injection molding system 100 may not have the compressed air pump 22. The injection molding system 100 may be supplied with compressed air, for example, from equipment at the industrial plant.

(C-8) In the foregoing embodiments, the injection molding machine 10 moves the moving mold 12M from the fixed mold 12S and thus causes the ejector pin 408 to protrude from the moving mold 12M toward the fixed mold 12S. However, the injection molding machine 10 may move the ejector pin 408 itself and thus cause the ejector pin 408 to protrude from the moving mold 12M to release the molded product from the mold.

(C-9) In the foregoing embodiments, the plasticizer 110 provided in the injection molding machine 10 plasticizes the material, using the flat screw 111. However, the plasticizer 110 may plasticize the material, using an in-line screw.

D. Other Configurations

The present disclosure is not limited to the foregoing embodiments and can be implemented with various other configurations without departing from the spirit and scope of the present disclosure. For example, a technical feature in the embodiments corresponding to a technical feature in each of the forms given below can be suitable replaced or combined with another technical feature, in order to solve a part or all of the foregoing problems or in order to achieve a part or all of the foregoing effects. The technical feature can be suitably deleted unless described as essential in this specification.

(1) According to a first configuration, an injection molding system is provided. The injection molding system includes: an injection molding machine where a shaping mold is installed; a material supply device supplying a material to the injection molding machine; a temperature controller controlling a temperature of the shaping mold; a dryer drying a material stored in the material supply device; a controller controlling the injection molding machine; and a casing. The injection molding machine, the material supply device, the temperature controller, the dryer, and the controller are provided inside the casing. The casing has a caster and is configured to be movable.

According to such a configuration, all of the devices for the injection molding machine to operate are arranged inside the casing. The casing is configured to be movable via the caster. Therefore, restrictions on the place where the injection molding machine can be used can be restrained.

(2) In the above configuration, a robot taking out a molded product from the shaping mold, an inspection device inspecting the molded product, and a moving mechanism moving a tray where the molded product is placed, to an ejection position where the tray can be taken out from outside, may be provided inside the casing. According to such a configuration, all of the devices used in a post-process after injection molding are arranged inside the casing. This improves the convenience of the injection molding system.

(3) In the above configuration, a first base, a second base arranged below the first base, and a third base arranged below the second base, may be provided inside the casing. The injection molding machine, the robot, the inspection device, and the moving mechanism may be arranged at the first base. The controller may be arranged at the second base. The material supply device, the temperature controller, and the dryer may be arranged at the third base. According to such a configuration, the respective devices can be efficiently arranged inside the casing while the controller is spaced apart from heat sources such as the injection molding machine, the dryer, and the temperature controller.

(4) In the above configuration, the first base may include a top stage part and a bottom stage part. The moving mechanism may be arranged at the bottom stage part. When the casing is viewed from above, at least one of the injection molding machine, the robot, and the inspection device may be arranged at the top stage part in such a way as to overlap a part of the moving mechanism. According to such a configuration, the injection molding system can be made compact while the operation range of the moving mechanism is extended.

(5) In the above configuration, when the casing is viewed from above, the inspection device, the injection molding machine, and the robot may be arranged clockwise or counterclockwise in this order in the casing. This configuration enables the robot to efficiently transport the molded product between the injection molding machine and the inspection device.

(6) In the above configuration, when the casing is viewed from above, an arrangement area where the inspection device, the injection molding machine, and the robot are arranged, and the ejection position, may not overlap each other. According to such a configuration, the ejection of the molded product can be restrained from affecting the operation of the robot.

(7) In the above configuration, the material supply device may have a pump generating compressed air. The material may be supplied from the material supply device to the injection molding machine via the compressed air. According to such a configuration, the injection molding system can operate without being supplied with compressed air from equipment at the industrial plant. This can increase the degree of freedom in installation of the injection molding system.

(8) In the above configuration, the shaping mold may have a fixed mold, a moving mold moving relatively to the fixed mold, and an ejector pin protruding from the moving mold toward the fixed mold due to the movement of the moving mold relative to the fixed mold. The robot may take out the molded product extruded from the moving mold by the ejector pin. According such a configuration, the ejector pin protrudes from the moving mold toward the fixed mold due to the movement of the moving mold relative to the fixed mold. Therefore, the molded product can be released from the moving mold without changing the position of the molded product. This enables the robot to take out the molded product with high accuracy.

(9) In the above configuration, the injection molding machine may have a flat screw having an end surface with a groove formed thereon, a barrel having a counter surface facing the end surface and having a communication hole formed at the counter surface, and a heater. The injection molding machine may melt the material supplied between the flat screw and the barrel by rotation of the flat screw and heating by the heater, and may inject the material into the shaping mold via the communication hole. According to such a configuration, the injection molding system can be made compact.

The present disclosure is not limited to the foregoing form of injection molding system and can also be implemented in various other forms such as an injection molding device, a method for manufacturing a molded product, and a method for controlling an injection molding system.

What is claimed is:

1. An injection molding system comprising:
    an injection molding machine where a shaping mold is installed;
    a material supply device supplying a material to the injection molding machine;
    a temperature controller controlling a temperature of the shaping mold;
    a dryer drying a material stored in the material supply device;
    a controller controlling the injection molding machine;
    a casing; and
    a moving mechanism having
        a tray where a molded product is configured to be placed,
        a first slide table on which the tray is configured to be placed in a first direction and which is slidable relative to the casing in a second direction intersecting with the first direction, and
        a second slide table on which the tray is configured to be placed in the first direction and which is slidable relative to the casing in a third direction intersecting with the first direction and the second direction,
    the controller being configured to control the first slide table to slide with the tray in the second direction from an inside position where the tray and the first slide table are positioned inside the casing to an ejection position where the tray and the first slide table are positioned outside the casing, and the tray is taken out from outside of the casing,
    the controller being configured to control the first and second slide tables such that the tray moves in the second direction and the third direction, to move the tray to the ejection position,
    the injection molding machine, the material supply device, the temperature controller, the dryer, and the controller being provided inside the casing,
    the moving mechanism when the tray and the first slide table are positioned at the inside position being further provided inside of the casing, and
    the casing having a caster and being configured to be movable,
    a first base, a second base arranged below the first base, and a third base arranged below the second base being provided inside the casing,
    the injection molding machine and the moving mechanism being arranged at the first base,
    the first base including a top stage part and a bottom stage part,
    the moving mechanism being arranged at the bottom stage part, and
    when the casing is viewed from above, the injection molding machine being arranged at the top stage part in such a way as to overlap a part of the moving mechanism.

2. The injection molding system according to claim 1, further comprising
    a robot taking out the molded product from the shaping mold, and
    an inspection device inspecting the molded product, wherein
    the robot and the inspection device are further provided inside the casing.

3. The injection molding system according to claim 2, wherein
    the robot and the inspection device, are arranged at the first base,
    the controller is arranged at the second base, and
    the material supply device, the temperature controller, and the dryer are arranged at the third base.

4. The injection molding system according to claim 3, wherein
    when the casing is viewed from above, at least one of the robot and the inspection device is further arranged at the top stage part in such a way as to overlap the part of the moving mechanism.

5. The injection molding system according to claim 3, wherein
    when the casing is viewed from above, the inspection device, the injection molding machine, and the robot are arranged clockwise or counterclockwise in this order in the casing.

6. The injection molding system according to claim 5, wherein
    when the casing is viewed from above, an arrangement area where the inspection device, the injection molding machine, and the robot are arranged, and the ejection position, do not overlap each other.

7. The injection molding system according to claim 3, wherein
    the material supply device has a pump generating compressed air, and
    the material is supplied from the material supply device to the injection molding machine via the compressed air.

8. The injection molding system according to claim 2, wherein the shaping mold has a fixed mold, a moving mold moving relatively to the fixed mold, and an ejector pin protruding from the moving mold toward the fixed mold due to the movement of the moving mold relative to the fixed mold, and the robot takes out the molded product extruded from the moving mold by the ejector pin.

9. The injection molding system according to claim 1, wherein the injection molding machine has:

a flat screw having an end surface with a groove formed thereon;

a barrel having a counter surface facing the end surface and having a communication hole formed at the counter surface; and a heater, and the injection molding machine melts the material supplied between the flat screw and the barrel by rotation of the flat screw and heating by the heater, and injects the material into the shaping mold via the communication hole.

\* \* \* \* \*